(12) United States Patent
Abhari et al.

(10) Patent No.: US 12,454,650 B2
(45) Date of Patent: Oct. 28, 2025

(54) METHOD FOR MANUFACTURE OF A BIOMASS-BASED DIESEL FROM FEEDSTOCK INCLUDING OLEFIN OLIGOMERS

(71) Applicant: Renewable Energy Group, Inc, Ames, IA (US)

(72) Inventors: Ramin Abhari, Bixby, OK (US); Martin Haverly, Ames, IA (US)

(73) Assignee: Renewable Energy Group, Inc., Ames, IA (US)

( * ) Notice: Subject to any disclaimer, the term of this patent is extended or adjusted under 35 U.S.C. 154(b) by 211 days.

(21) Appl. No.: 18/479,421

(22) Filed: Oct. 2, 2023

(65) Prior Publication Data

US 2024/0124784 A1 Apr. 18, 2024

Related U.S. Application Data

(60) Provisional application No. 63/378,193, filed on Oct. 3, 2022.

(51) Int. Cl.
*C10G 50/00* (2006.01)
*C10G 3/00* (2006.01)

(52) U.S. Cl.
CPC ............... *C10G 3/50* (2013.01); *C10G 50/00* (2013.01); *C10G 2300/1011* (2013.01); *C10G 2300/304* (2013.01); *C10G 2300/307* (2013.01); *C10G 2400/04* (2013.01); *C10G 2400/08* (2013.01)

(58) Field of Classification Search
None
See application file for complete search history.

(56) References Cited

U.S. PATENT DOCUMENTS

| | | | |
|---|---|---|---|
| 2,939,999 A | 6/1960 | Van Iperen | |
| 5,814,109 A | 9/1998 | Cook et al. | |
| 7,968,757 B2 | 6/2011 | Abhari et al. | |
| 8,022,258 B2* | 9/2011 | Myllyoja | C07C 5/03 585/240 |
| 8,026,401 B2 | 9/2011 | Abhari et al. | |
| 8,975,461 B2 | 3/2015 | Peters et al. | |
| 9,404,064 B2 | 8/2016 | Guay et al. | |
| 9,708,544 B2* | 7/2017 | Hanks | C10G 3/44 |

(Continued)

OTHER PUBLICATIONS

Search Report and Written Opinion for PCT/US2023/075699 dated Feb. 13, 2024.

(Continued)

*Primary Examiner* — Tam M Nguyen
(74) *Attorney, Agent, or Firm* — Nyemaster Goode, P.C.

(57) ABSTRACT

The present technology relates to biofuels, and more particularly, to biomass-based diesel from olefin oligomers. Diesel fuels with cetane number of 49 or greater are prepared by blending hydrocarbons produced by olefin oligomerization with renewable diesel, resulting in a blended fuel that has a lower cloud point than the cloud point of the renewable diesel. A different aspect relates to an integrated process for lipid HDO and olefin oligomerization wherein the propane coproduct of lipid HDO is subjected to dehydrogenation to produce a vapor stream having propylene and hydrogen. The propylene is subsequently oligomerized to iso-olefins and the iso-olefins are combined with the lipid feed for hydrogenation in the HDO reactor.

14 Claims, 3 Drawing Sheets

(56) References Cited

U.S. PATENT DOCUMENTS

| | | | |
|---|---|---|---|
| 2009/0253947 A1 | 10/2009 | Brandvold et al. | |
| 2010/0317903 A1* | 12/2010 | Knuuttila | C01B 3/382 |
| | | | 585/800 |
| 2012/0283493 A1 | 11/2012 | Olson et al. | |
| 2014/0051897 A1 | 2/2014 | Peters et al. | |
| 2017/0218283 A1 | 8/2017 | Lilga et al. | |
| 2017/0260548 A1 | 9/2017 | Marlire et al. | |
| 2019/0338219 A1 | 11/2019 | White et al. | |
| 2020/0010767 A1 | 1/2020 | Smith et al. | |
| 2023/0279305 A1* | 9/2023 | Kuronen | C10G 3/50 |
| | | | 585/14 |
| 2024/0124784 A1* | 4/2024 | Abhari | C10L 1/08 |

OTHER PUBLICATIONS

Compendium of Experimental Cetane Numbers (National Renewable Energy Laboratory; 2017).

* cited by examiner

METHOD FOR MANUFACTURE OF A BIOMASS-BASED DIESEL FROM FEEDSTOCK INCLUDING OLEFIN OLIGOMERS

This application claims priority from U.S. Provisional Application No. 63/378,193 filed Oct. 3, 2022, which is incorporated herein by reference in its entirety.

FIELD OF THE INVENTION

The present technology relates to biofuels, and more particularly, to biomass-based diesel.

BACKGROUND OF THE INVENTION

Hydroprocessing of lipids for production of Renewable Diesel (RD) fuel has been described in the prior art such as U.S. Pat. Nos. 8,026,401 and 7,968,757, which are hereby incorporated by reference. As described in these and several other references, RD is typically produced in two conversion steps. In the first step, a hydrodeoxygenation (HDO) reaction converts the lipid fatty acid/glyceride molecules to hydrocarbons comprising n-paraffins in the diesel boiling range and propane. Water, CO, and $CO_2$ are the main byproducts of HDO. To convert the C16+ n-paraffin "wax" and improve cloud point and other low temperature flow properties, the straight-chain n-paraffins in the HDO product are converted to mainly methyl-branched paraffins in the second step. This second step is referred to as "catalytic dewaxing" or "hydroisomerization" (HI).

HDO reactors typically operate with partial recycle of hydrocarbon product. The hydrocarbon recycle acts as a solvent diluting the lipid feed. Dilution provides a number of benefits to HDO performance. These include control of the heat release associated with the exothermic reaction, improving hydrogen solubility, and minimizing undesirable side reactions. Some prior art references teach the use of hydrocarbon-to-lipid dilution ratios of at least 5:1. High dilution and recycle rates often necessitates the use large reactors and recycle pumps. This translates to a correspondingly higher capital and operating cost per unit volume of RD produced.

Due to virtual absence of aromatics in its paraffinic hydrocarbon composition, RD is considered a premium diesel fuel. Depending on the lipid feedstock, RD typically has a carbon intensity in the range of 30-40 $gCO_2e/MJ$ range. Carbon intensity is a measure of life cycle greenhouse gas (GHG) emissions expressed as grams of $CO_2$ equivalent per megajoule of the combustion energy provided by the fuel. The cited RD carbon intensity value is 60-70% lower than what is reported for petroleum-based diesel fuels. As such, RD production has grown rapidly over the past decade as a response to climate change. With further increases in production capacity announced, the availability of lipid feedstock for RD production has emerged as a potential long-term concern.

Sugars represent another class of biofuel feedstock. These can be fermented to alcohols for direct use in gasoline engines. Ethanol and isobutanol are examples of such alcohols. Although corn and sugarcane are commonly used for bio-alcohols today, fermentable sugars may also be produced by hydrolysis of cellulose and hemicellulose derived from woody biomass. As such, sugar and starch represent a potentially abundant source of low carbon intensity renewable biofuel feedstocks.

In order to utilize these feedstocks for manufacture of middle distillate fuels (i.e., kerosene and diesel), the alcohols are first converted into olefins via catalytic dehydration. The olefins (e.g., ethylene and butenes) are subsequently subjected to oligomerization to produce mainly branched olefinic dimers, trimers, tetramers, pentamers, and depending on conditions, even larger molecules (referred to as iso-olefins). Oligomerization, like all polymerization reactions, produces a range of hydrocarbon molecular weights according to the Schulz-Flory distribution. In most cases, these iso-olefins are highly branched, with virtually no straight-chain hydrocarbons in the product composition. The iso-olefins may be hydrogenated and fractionated to provide isoparaffinic middle distillate cuts. U.S. Pat. No. 8,975,461 describes such a method. US Patent Publication 2017/0260548 discloses production of isobutene directly from fermentation (without first producing the alcohol).

Due to the highly branched nature of the oligomer molecules (including multiple tertiary and quaternary carbons in the hydrocarbon chain), the corresponding fuels generally have very low cetane numbers. For example, the aforementioned '461 patent shows that the C12 and C16 hydrocarbons from oligomerization/hydrogenation of isobutene include 2,2,4,6,6-pentamethyl heptane (isododecane) and 2,2,4,4,6,8,8-heptamethyl nonane (isohexadecane). These compounds are reported in the *Compendium of Experimental Cetane Numbers* (National Renewable Energy Laboratory; 2017) to have cetane values of 9 and 15 respectively. The minimum cetane numbers specified for diesel fuel according to industry standards ASTM D975 and EN 590 are 40 and 49 respectively, suggesting that olefin oligomerization is not an appropriate method for manufacture of diesel fuel products.

When ethylene (from ethanol dehydration) is used for production of middle distillate fuels, the oligomerization reactor system is generally operated such that the ethylene is first dimerized to butenes before oligomerization of butenes to higher boiling hydrocarbons. As such, a similar branched isoparaffinic hydrocarbon results. According to examples in US Patent Publication 2017/02188283, the straight-chain hydrocarbon product from ethanol-based ethylene oligomerization is only 0.2-0.3%.

The present invention solves at least two of the foregoing unmet needs. First, it provides a method for manufacture of high cetane, drop-in renewable hydrocarbon diesel from a sugar-based feedstock. Second, it provides a method to operate renewable diesel reactors without hydrocarbon product recycle thus allowing for more productive utilization of reactor assets.

SUMMARY

In one aspect of the present technology, diesel fuels with cetane number of 49 or greater are prepared by blending hydrocarbons produced by olefin oligomerization with renewable diesel, resulting in a blended fuel that has a lower cloud point than the cloud point of the renewable diesel.

In a different aspect of the present technology, olefin oligomers (iso-olefins) are hydrogenated to iso-paraffins in a lipid hydrodeoxygenation (HDO) reactor and the volumetric ratio of iso-olefins to lipid feedstock is about in the 1:5 to 5:1 range. In embodiments, the olefins are derived from ethanol and/or isobutanol. In other embodiments, the HDO reaction is performed with no solvent or product recycle. In further embodiments, the HDO product is used as a renewable diesel fuel without a subsequent isomerization step. In yet further embodiments, the HDO product has a cloud point less than 0° C. and a cetane number of 49 or higher.

A different aspect of the present technology relates to an integrated process for lipid HDO and olefin oligomerization. In some embodiments, the propane coproduct of lipid HDO is subjected to dehydrogenation to produce a vapor stream having propylene and hydrogen. The propylene is subsequently oligomerized to iso-olefins and the iso-olefins are combined with the lipid feed for hydrogenation in the HDO reactor.

DETAILED DESCRIPTION

Figure 1:
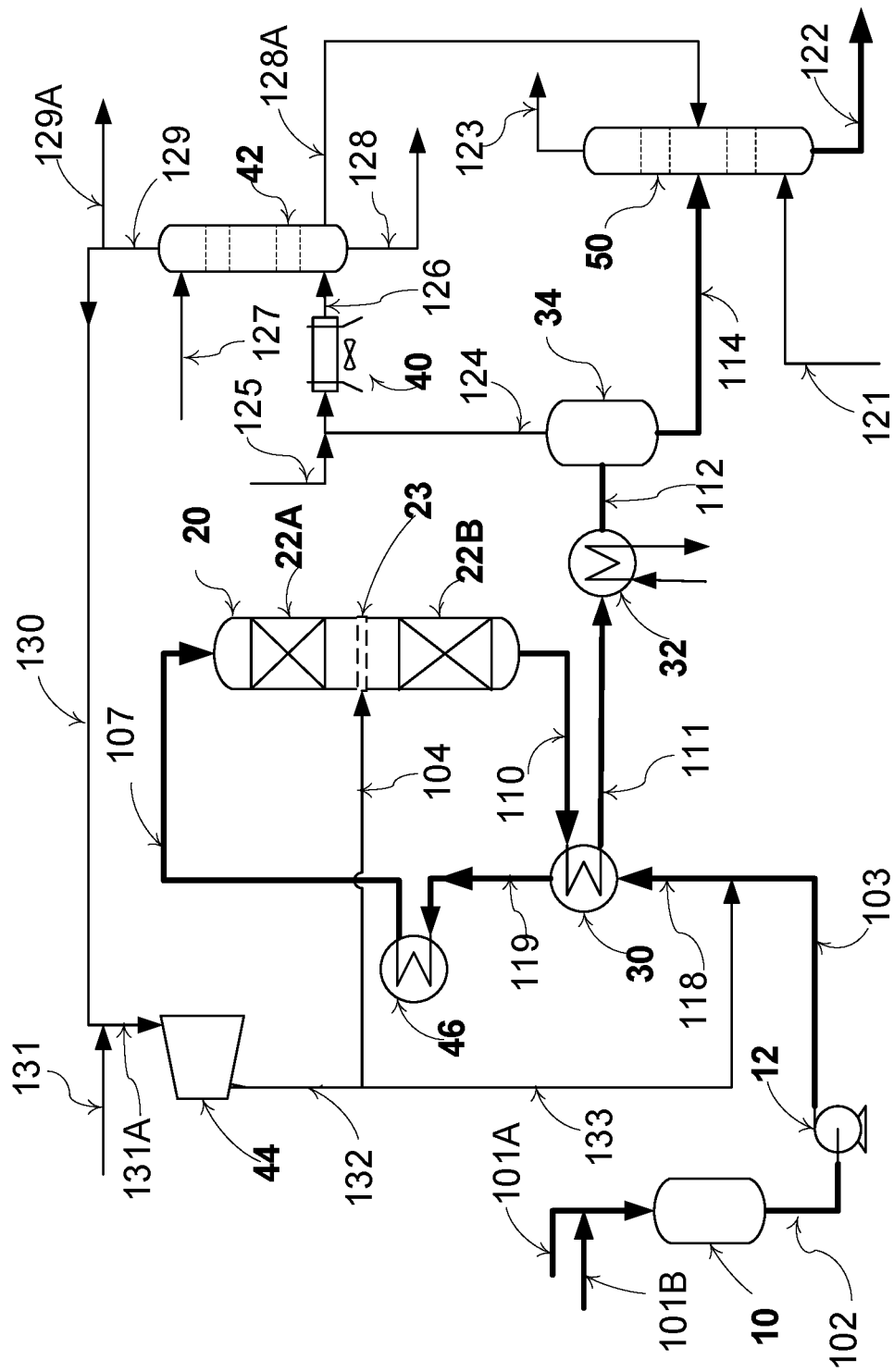
FIG. 1 is a process flow diagram showing a process for producing renewable diesel according to an embodiment of the present technology.

In this disclosure, the term hydrodeoxygenation or HDO is used to describe the reaction where deoxygenation of the feedstock (e.g., removal of the oxygen heteroatom from feeds such as fatty acid glycerides) is conducted under hydrogen pressure in the presence of a catalyst. Although HDO specifically refers to the removal of oxygen with hydrogen in the form of water, the reaction is typically accompanied by decarboxylation (removal of oxygen as $CO_2$) and decarbonylation (removal of oxygen as CO) and saturation of carbon-carbon double bonds. The HDO product is a hydrocarbon rich in straight chain paraffins (n-paraffins).

In this specification, the term hydroisomerization or HI is used to describe the partial conversion of HDO product to a mixture of linear and methyl branched paraffins. In this specification, the term paraffin includes both n-paraffins and the methyl branched paraffins produced by hydroisomerization.

In this specification, the term oligomer iso-olefin refers to the branched hydrocarbon distribution produced by oligomerization of olefins such as propylene or butenes. The term oligomer iso-paraffins refers to the saturated product corresponding to the iso-olefins; i.e., the product of iso-olefin hydrogenation.

Conversion of alcohols to olefins: The conversion of alcohols to olefins is given by Eq. 1, where n has a value of 2 or greater.

  (1)

Common fermentation-derived alcohols include ethanol ($C_2H_5$—OH) and butanol ($C_4H_7$—OH), although bio-based processes for propanol and pentanol (also known as amyl alcohol) have also been disclosed and known to persons skilled in the art (e.g., US Patent Publication 2009/0014689).

Eq. 1 is referred to as alcohol dehydration and is conducted with both heterogeneous and homogeneous catalysts. Examples of heterogeneous catalysts include various acid treated and untreated alumina and silica catalysts and clays. These include zeolites (e.g., ZSM-5), fluoride-treated clay catalysts, and sulfonic acid resins. Since the dehydration reaction produces water as a byproduct, the catalysts used for the reaction generally need to be water tolerant. Homogeneous catalysts for alcohol dehydration include phosphoric acid, sulfuric acid, and Lewis acids such as aluminum trichloride and boron trifluoride.

Alcohol dehydration reactions are generally conducted at temperatures from about 450 to about 650° F. under pressures in the 0-100 psig range. A typical commercial embodiment involves introduction of the alcohol in vapor phase to a fixed-bed reactor comprising a zeolite catalyst. A method for converting Fischer-Tropsch alcohols to olefins is described in U.S. Pat. No. 6,939,999.

Publications, patents and patent applications are referred to throughout this disclosure. All references cited herein are hereby incorporated by reference.

Paraffin Dehydrogenation: Propane and n-butane/isobutane dehydrogenation are commercial processes with technology licenses provided by companies such as UOP (OLEFLEX), CB&I McDermott/Clariant (CATOFIN), and Thyssenkrupp Industrial Solutions/Uhde (STAR). Unlike thermal cracking (e.g., steam cracking) of LPG/naphtha that produces a number of different olefins and diolefins, these selective catalytic reactions maintain feedstock hydrocarbon structure during unsaturation as shown in Eq. 2.

  (2)

Paraffin dehydrogenation is an endothermic reaction that is favored at high temperatures and low pressures (to drive the gas phase equilibrium reaction in Eq. 2 to the right-hand side of the equation). In order to achieve per pass conversions of around 50-65% with this equilibrium-limited reaction, commercial dehydrogenators operate at over 1,000 to 1,200° F. and pressures ranging from slight vacuum to 40 psig. Due to such high operating temperatures, the catalyst tends to deactivate by coking. Commercial reactor systems thus include provisions for catalyst regeneration by coke burn-off. In one reactor system, steam is introduced to mitigate carbon formation.

Catalysts used for commercial dehydrogenation processes are two types: (1) supported noble metals, mainly Pt—Sn on alumina or aluminates of Zn and Mg, with alkali-metal-oxide promoters; and (2) chromium oxides supported on alumina or zirconia, promoted with cesium, potassium, or rubidium.

Commercial dehydrogenator designs include adiabatic fixed bed reactors with reaction, purge, and/or regeneration cycles, isothermal top-fired multi-tube reactors, moving-bed reactors with inter-stage heaters, and fluidized bed reactors with circulation through regenerator (thus providing heat for the reaction).

Olefin oligomerization: The conversion of light olefins to higher boiling range iso-olefins is given by Eq. 3 for the illustrative case of propylene. The value n represents the number of repeating units in the oligomer, with 2 corresponding to a dimer, 3 to a trimer, 4 to a tetramer, and so on.

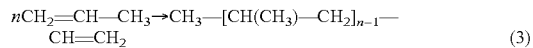  (3)

Olefin oligomerization is a petroleum refinery process dating back to the 1930s. It has been used for production of so-called "polymer gasoline" (dimers/trimers of propylene and/or butenes). The process has also been used for production of chemical intermediates nonene and dodecene and end products used as surfactants, plasticizers, and lubricants. The reaction has historically been conducted over beds of solid phosphoric acid (SPA) catalyst at 300 to 1,100° F. under pressures ranging from near atmospheric to 2,000 psig. The average molecular weight of the product (or average carbon number) is inversely related to temperature, with lower temperatures favoring production of heavier hydrocarbons. To increase yield of the diesel boiling range fraction, a portion of the gasoline-range hydrocarbons (i.e., dimers of propylene and butenes) are partially recycled to the reactor. This recycle is often in the form of liquid quench between beds of catalyst for mitigating the temperature rise associated with the exothermic oligomerization reaction. Acidic zeolite catalysts have been used in more recent commercial processes. Other catalysts reported in recent scientific and patent literature include zirconia, tungstated zirconia, sulfated titania, and nickel modified tungstated zirconia which are reported to be more active and water tolerant than SPA catalysts.

Hydrogenation and Hydrodeoxygenation: The iso-olefins produced by oligomerization are hydrogenated for conversion to isoparaffinic kerosene. Hydrogenation is often carried out under relatively high pressures (from 100 to 2,000 psig) at temperatures in the 250 to 500° F. range. Preferred catalysts include palladium on alumina, or reduced nickel on same supports or as a sponge metal catalyst (e.g., RANEY catalysts).

For lipid hydrodeoxygenation, a sulfided molybdenum or tungsten catalyst with hydrogenolysis activity is preferred. Promoters for HDO catalysts include nickel and cobalt. In the present invention, the reactor conditions are selected such that iso-olefin hydrogenation and lipid HDO occur simultaneously as shown in Eq. 4 below. Eq. 4 takes place at temperatures in the 500 to 700° F. range under about 500 to 2,500 psi $H_2$ partial pressure.

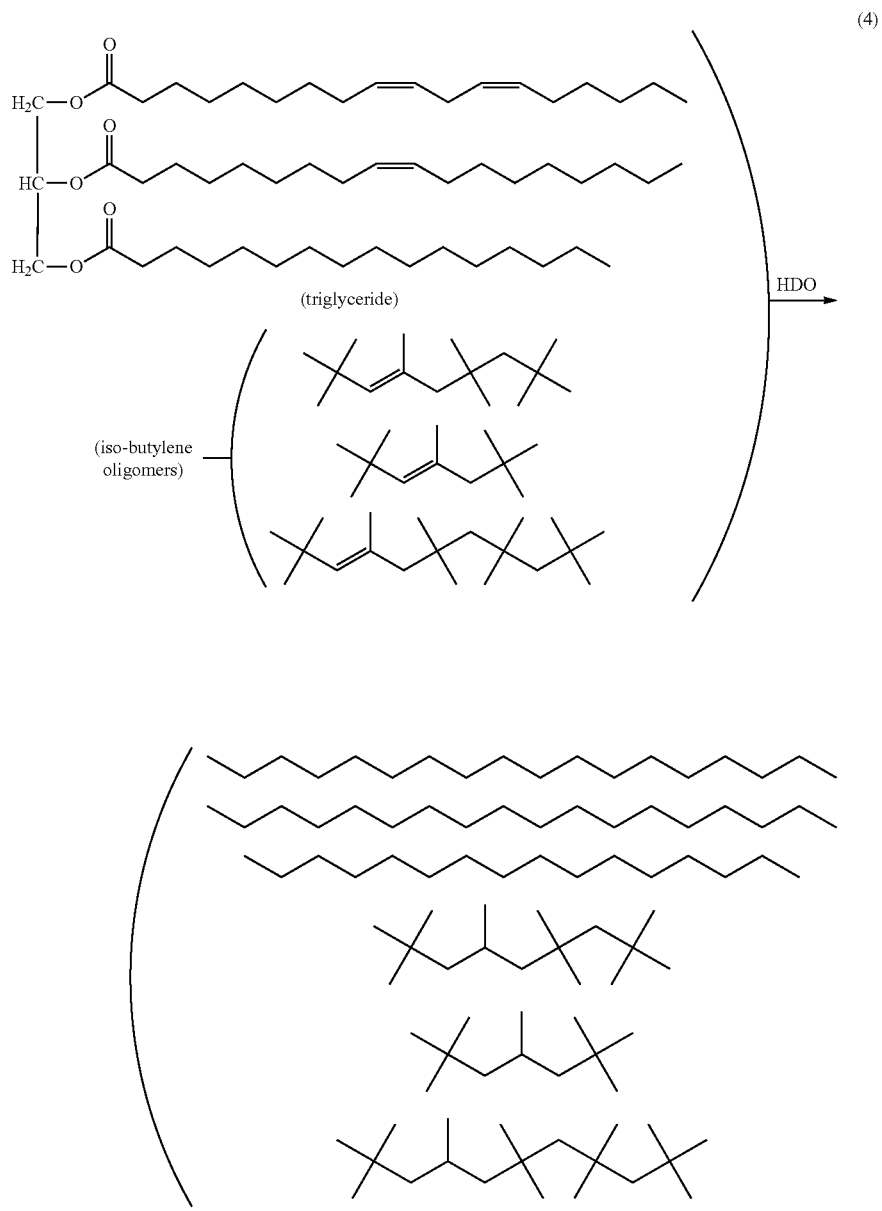

Embodiments of the Present Technology

Referring to the process embodiment depicted in FIG. 1, a lipid feed 101A which includes naturally occurring fatty acids and fatty acid esters/glycerides is combined with oligomer feed 101B in a drum 10 to provide a combined feedstock 102 for transfer to HDO reactor 20.

Exemplary components of lipid feed 101A include, but are not limited to, animal fat, animal oil, microbial oil, plant fat, plant oil, vegetable fat, vegetable oil, grease, or a mixture of any two or more thereof (broadly referred to as FOG). For example, lipid feed 101A may include plant and/or vegetable oils and/or microbial oils. These include, but are not limited to, corn oil, distiller's corn oil, inedible corn oil, babassu oil, carinata oil, soybean oil, canola oil, coconut oil, rapeseed oil, tall oil, tall oil fatty acid, palm oil, palm oil fatty acid distillate, palm sludge oil, jatropha oil, palm kernel oil, pennycress oil, sunflower oil, castor oil, camelina oil, archaeal oil, bacterial oil, fungal oil, protozoal oil, algal oil, seaweed oil, oils from halophiles, seed oils from field pennycress and other flowering plants, and mixtures or combinations of any two or more thereof. These may be classified as crude, degummed, and RBD (refined, bleached, and deodorized) grade, depending on level of pretreatment and residual phosphorus and metals content. However, any of these grades may be used in the present technology. Animal fats and/or oils as used above includes, but is not limited to, inedible tallow, edible tallow, technical tallow, floatation tallow, bleachable fancy tallow, lard, technical lard, choice white grease, poultry fat, poultry oils, fish fat, fish oils, and mixtures of any two or more thereof. Greases may include, but are not limited to, yellow grease, brown grease, waste vegetable oils, restaurant greases, trap grease from municipalities such as water treatment facilities, spent oils from industrial packaged food operations, and mixtures of any two or more thereof.

Lipid feed 101A may include up to 90% free fatty acids (FFA). Specifically, renewable feed 101 may include about 5 wt. %, about 10 wt. %, about 15 wt. %, about 20 wt. %, about 25 wt. %, about 30 wt. %, about 35 wt. %, about 40 wt. %, about 45 wt. %, about 50 wt. %, about 55 wt. %, about 60 wt. %, about 65 wt. %, about 70 wt. %, about 75 wt. %, about 80 wt. %, about 85 wt. %, about 90 wt. %, or any range including and/or in between any two of these values.

Lipid feed 101A may optionally be pretreated to remove phosphorus and metal contaminants to less than 10 wppm total, as disclosed in the prior art (e.g., U.S. Pat. No. 9,404,064 to Guay).

Oligomer feed 101B is a hydrocarbon comprising iso-olefins (branched hydrocarbon molecular structures with a carbon-carbon double bond) formed by oligomerization of ethylene, propylene, and/or butenes (including 1-butene, 2-butene, and isobutene or isobutylene). In embodiments, the iso-olefins are produced by oligomerization of isobutene. In embodiments, the isobutene is the product of an isobutanol dehydration reaction, wherein the isobutanol is bio-isobutanol formed by fermentation of sugars/starch.

Oligomer feed 101B has a carbon number in the C6-C30 range, preferably C6-C24. The ratio of oligomer feed 101B to lipid feed 101A may vary broadly. In embodiments, the ratio of oligomer feed 101B to lipid feed 101A may vary between about 5:1 to about 1:5, preferably between about 3:1 to about 1:3 ratio. In embodiments, the ratio of oligomers to lipid is from about 3:1 to about 5:1.

Feeds 101A and 101B are combined in a surge drum 10 to form the combined feed 102. The combined feed 102 is transferred to the HDO reactor 20 with a high-pressure pump 12 to form a pressurized liquid feed 103. The pressurized liquid feed 103 is further combined with a pressurized hydrogen 133 to form a mixed-phase feed 118. The mixed-phase feed 118 is then heated through a feed-effluent exchanger 30 to form a partially heated feed 119. The partially heated feed 119 is further heated with a reactor preheater 46 to provide a reactor feed 107. The reactor feed 107 is maintained at a temperature between 420 and 680° F., preferably between 450 and 650° F.

The HDO reactor 20 includes at least one bed of a sulfided catalyst and includes molybdenum or tungsten. Preferred catalysts include sulfided nickel-molybdenum (NiMo), nickel-tungsten (NiW), or cobalt-molybdenum (CoMo) on alumina or silica-alumina supports. It should be understood by one of ordinary skill in the art that any catalyst or combination of catalysts may be used in the present invention so long as the catalyst system functions in accordance with the present invention as described herein.

To maintain the active metal sulfide functionality of the catalyst despite absence or very low (<40 wppm) concentrations of organic sulfur in most oligomer and lipid feedstocks, the combined feed 102 may be supplemented with a sulfur compound that decomposes to hydrogen sulfide when heated and/or contacted with a catalyst. Two preferred sulfur compounds are dimethyl disulfide and carbon disulfide. Preferred concentration of these in the combined feed 102 is from about 100 to about 2,000 ppm by weight sulfur. Alternatively, feed 102 may include a petroleum fraction wherein the petroleum-fraction provides the sulfur.

Each bed of the HDO reactor 20 catalyst beds may be operated at a temperature falling in the range from about 450° F. (232° C.) to about 750° F. (399° C.). A weighted average bed temperature (WABT) is commonly used in fixed bed, adiabatic reactors to express the "average" temperature of the reactor which accounts for the nonlinear temperature profile between the inlet and outlet of the reactor according to Eq. 5.

$$WABT = \sum_{i=1}^{N}(WABT_i)(Wc_i) \tag{5}$$

$$WABT_i = \frac{T_i^{in} + 2T_i^{out}}{3}$$

In Eq. 5, $T_i^{in}$ and $T_i^{out}$ refer to the temperature at the inlet and outlet, respectively, of catalyst bed i. As shown, the WABT of a reactor system with N different catalyst beds may be calculated using the WABT of each bed ($WABT_i$) and the weight fraction of catalyst in each bed ($Wc_i$). The WABT of the HDO reactor 20 is between 540 and 680° F., preferably between 580 and 650° F.

In FIG. 1, a reactor with two beds is shown with a top bed 22A and a bottom bed 22B. Each bed 22A, 22B contains about half of the total catalyst mass in the reactor. In this embodiment, a hydrogen quench gas 104 is introduced through a mixing box 23 between the two beds 22A, 22B.

In embodiments, the top bed 22A contains inert media graded by size to distribute any picked up solid particulates and mitigate pressure drop buildup. In other embodiments, the bottom bed 22B contains catalyst with isomerization activity. Examples of such catalysts include those with acid functionality supports such as NiW on silica-alumina. The support may be crystalline or amorphous with the former containing zeolites.

The HDO reactor 20 operates at a pressure between 500 and 3,000 psig, preferably between 1000 and 2000 psig. The liquid hourly space velocity through the HDO reactor 20 is from about 0.2 to about 10 h$^{-1}$, preferably from about 0.5 to about 5.0 h$^{-1}$ (volumetric flow of the combined feed 102 per hour per volume of catalyst). The ratio of hydrogen-rich treat gas 132 to the combined feed 102 is in the about 4,000 to about 15,000 SCF/bbl range, preferably between 5,000 and 12,000 SCF/bbl. The hydrogen-rich treat gas 132 may contain from about 70 to about 100 mol. % hydrogen.

An HDO reactor effluent 110 is partially cooled through feed-effluent exchanger 30 to provide a partially cooled HDO reactor effluent 111 before further cooling through a cooler 32 to provide a cooled HDO reactor effluent 112. The cooled reactor effluent 112 includes a liquid hydrocarbon fraction and a vapor fraction comprising unreacted hydrogen. The liquid includes n-paraffins and iso-paraffins mainly in the C6-C24 range with up to 2% of compounds heavier than C24. The hydrogen-rich vapors include C1-C6 hydrocarbons, water, carbon oxides, ammonia, and hydrogen sulfide, in addition to hydrogen. The liquid and the vapor in the two-phase cooled reactor effluent 112 are separated in a hot separator 34.

The hot separator 34 is operated at HDO reactor discharge pressure (about 500 to about 2,000 psig in the preferred embodiment) at a temperature between 250 and 500° F.

A vapor stream 124 comprising C1-C6 hydrocarbons, unreacted hydrogen, water, carbon oxides, ammonia, and hydrogen sulfide is cooled through a cooler 40 to provide a cooler effluent 126 comprising condensed liquids. The cooler 40 is operated such that the cooler effluent 126 has a temperature between about 80 and 150° F. A water stream 125 is introduced to wash the cooler 140 and minimize deposition of salts such as those comprising ammonium and sulfide ions.

The cooler effluent 126 includes "sour" water, condensed hydrocarbons, and a hydrogen-rich gas. These components are separated in cold separator 42 to yield a sour water 128, a condensed hydrocarbon stream 128A and a hydrogen-rich gas 129. The condensed hydrocarbon stream 128A includes the lighter fraction of the HDO reactor hydrocarbons, mainly those in the C3-C18 range. In still other embodiments, a gas absorption solvent 127 is introduced to the cold separator 42 to promote removal of impurities such as $CO_2$ and $H_2S$ from the hydrogen-rich gas absorption solvent 127. The gas absorption solvent 127 may be any aqueous alkaline solution such as those including amines or sodium hydroxide.

In addition to hydrogen, the hydrogen-rich gas 129 contains propane and minor amounts of other non-condensable hydrocarbons. The gas is mostly recycled to the HDO reactor as a recycled hydrogen gas stream 130 while a bleed gas 129A is removed from the HDO reactor system to ensure that the non-reactive components do not build up in the recycle gas.

The recycled hydrogen gas stream 130 is combined with a makeup hydrogen gas 131 to provide a treat gas 131A for compression in compressor 44. The compressor 44 pressurizes the treat gas to reactor pressure (500-3000 psig; preferably 1000-2000 psig) to provide a pressurized hydrogen-rich treat gas 132 for the HDO reactor 20 as described previously in description of this embodiment.

Returning to the hot separator 34, a hydrocarbon liquid 114 including those of C8-C24 hydrocarbons, with up to 3% hydrocarbons heavier than C24, is processed through a stripper column 50 wherein steam 121 provides the duty for vaporization. The columns 50 may alternatively use a reboiler instead of steam for achieving the objective of the column 50. The condensed hydrocarbon stream 128A is also fed to the stripper column 50 to provide a stripped hydrocarbon product 122 and a stripper overhead vapor 123. The stripper column 50 operates at pressures less than the hot separator 34 and cold separator 42. In embodiments, the stripper column 50 operates at a pressure between 50 psig and 500 psig, preferably between 60 psig and 200 psig. The purpose of the stripper column 50 is to remove water, hydrogen sulfide, ammonia from the hydrocarbon product 122. The hydrocarbon product 122 thus includes less than 100 wppm water, less than 5 wppm sulfur, and less than 5 wppm nitrogen. In embodiments, the stripper column 50 is operated to removed light hydrocarbons such that the hydrocarbon product 122 has a flash point of 38° C. or higher, preferably 52° C. or higher. In embodiments, the overhead vapor 123 comprises C8 or lighter hydrocarbons, including C6 and C8 iso-paraffins.

The hydrocarbon product 122 has an isoparaffin-to-normal paraffin ratio between about 5:1 and 1:5 wherein the iso-paraffins are multi-branched; in other words, the isoparaffin have two or more alkyl substituents. In embodiments, the isoparaffin-to-normal paraffin ratio is between about 3:1 and 1:3. Depending on the oligomer feedstock and the lipid fatty acid profile, the hydrocarbon product 122 has a carbon number in the C6-C24 range with about 2-3% hydrocarbons heavier than C24. In embodiments, the hydrocarbon product 122 has a carbon number in the C8-C24 range. In embodiments, the hydrocarbon product 122 has a cetane number of 49 and higher, a cloud point of 10° C. or lower, and a flash point of 52° C. or higher. In embodiments, the hydrocarbon product 122 is used directly as a drop-in renewable diesel fuel conforming to ASTM D975 or EN 590 standards.

In some embodiments, particularly when the isoparaffin-to-normal paraffin ratio is below 2:1, the hydrocarbon product 122 is hydroisomerized according to methods described in the prior art (e.g., U.S. Pat. No. 5,814,109) to further reduce cloud point and other low temperature attributes of the renewable diesel product.

In other embodiments, an isoparaffinic kerosene (a mainly C9-C15 fraction of the renewable diesel fuel described herein) is separated by distillation of the hydrocarbon product 122.

Figure 1A:
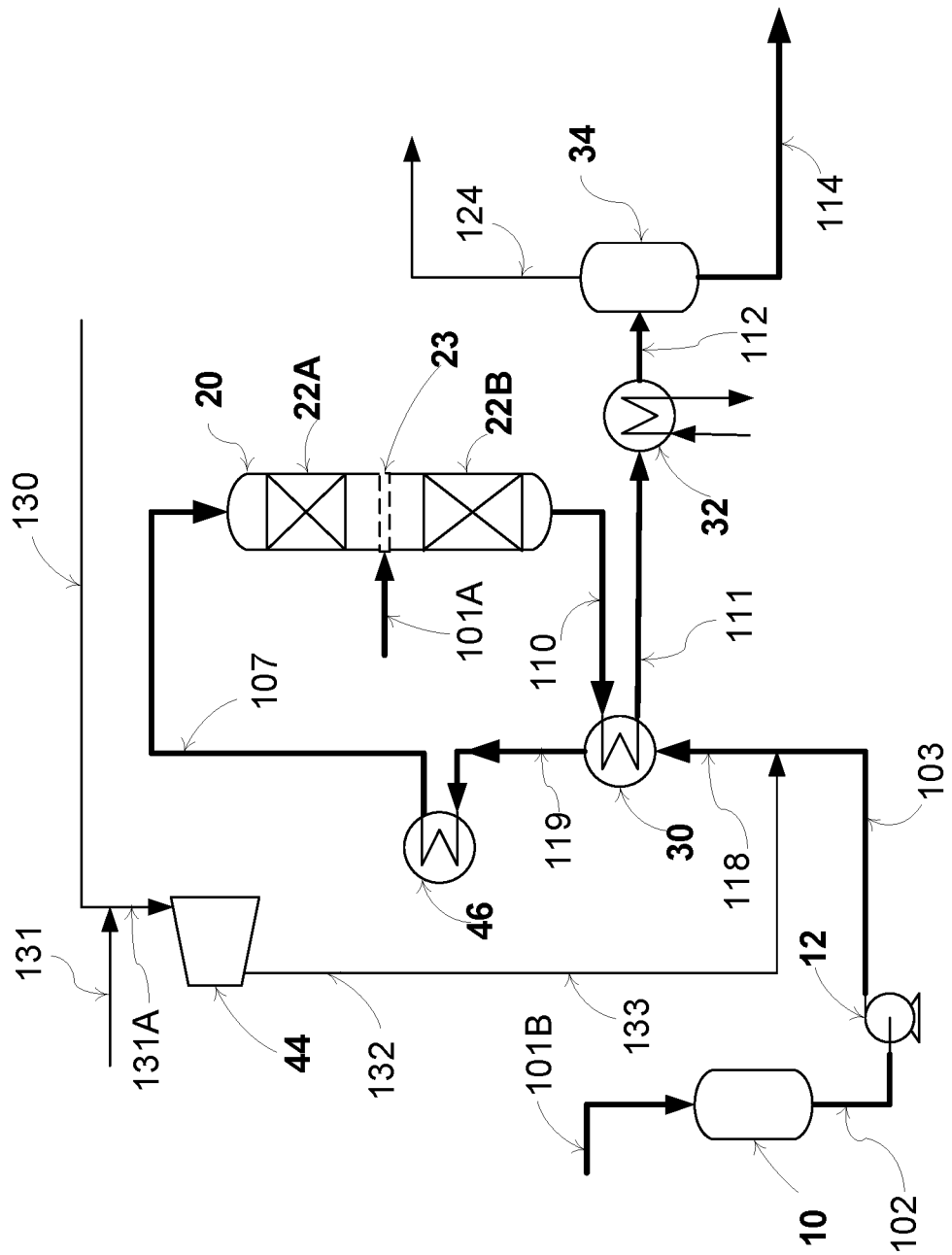
FIG. 1A is a process flow diagram showing an alternate embodiment for producing biomass-based diesel according to the present technology.

In FIG. 1A, selected elements of the FIG. 1 are shown to highlight an alternate embodiment. In this embodiment, the lipid feedstock 101A and the oligomer iso-olefins 101B are not combined as a single reactor feed. Instead, the oligomer iso-olefins 101B are fed to the top bed 22A of the HDO reactor 20 while the lipid feedstock is fed (through a high-pressure pump not shown) to the bottom bed 22B. In the FIG. 1A embodiment, the top bed 22A includes a non-sulfided hydrogenation catalyst (e.g., reduced nickel or palladium on an alumina support), whereas the bottom bed 22B contains the sulfided catalyst described earlier in the description of FIG. 1. In the FIG. 1A embodiment, the hydrogen gas stream 130 is essentially free of $H_2S$ or is treated to reduce $H_2S$ to levels that do not impact performance of the non-sulfided catalyst is the top bed 22B. As such, the sulfur compound specified in the description of FIG. 1 is introduced only to the bottom bed 22B containing the sulfided catalyst.

In yet another embodiment, the propane coproduct of hydrodeoxygenation of mono-, di-, and tri-glyceride hydrodeoxygenation (corresponding to the glycerol component of the glyceride esters) is subjected to dehydrogenation. The propylene product of the dehydrogenation reaction is subsequently oligomerized and the oligomer product directed to the HDO reactor 20. This embodiment effectively converts bio-propane to renewable diesel and kerosene (e.g. for use as a jet fuel blendstock) while achieving the benefits described herein, such as reducing the amount of hydrocarbon recycle for lipid dilution and providing an HDO hydrocarbon comprising multi-branched iso-paraffins. This embodiment is explained through the discussion with FIG. 2.

Figure 2:
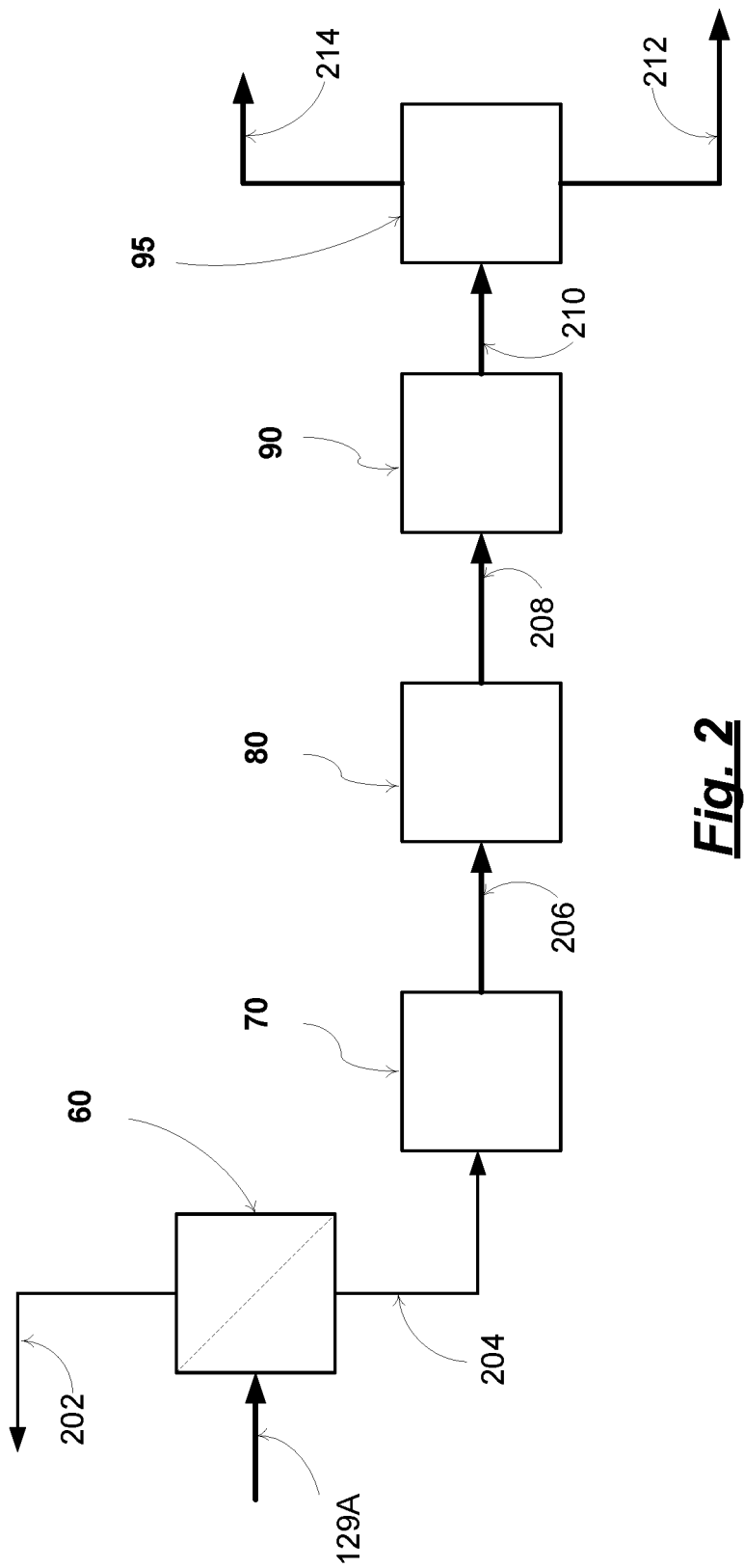
FIG. 2 is a process flow diagram showing an alternate embodiment of the present technology where propane from lipid HDO is dehydrogenated to propylene for oligomerization.

Referring to FIG. 2, the bleed gas 129A from HDO cold separator gas, described previously in reference to the FIG. 1 embodiment, is directed to a gas membrane 60 where the gas is split into a permeate 202, and a retentate 204. The smaller gas molecules selectively concentrate in the permeate while the larger ones concentrate in the retentate. In embodiments, bleed gas 129A has a hydrogen concentration between about 75 and 90 mol. %. The permeate 202 is enriched to 92-96 mol. % $H_2$ with propane content of 0.5 mol. % or less. The retentate 204 is enriched to 30-50 mol. % propane, with hydrogen concentration reduced to 40-60%.

The retentate 204 is directed to a dehydrogenation reactor system 70. There, under conditions of low pressure and high temperature described previously herein (under the subsection on dehydrogenation prior art) is converted to propylene at 50 to 65% conversion. A dehydrogenator effluent 206 comprising propylene, propane, and hydrogen is cooled and compressed in the cooler/compression unit 80 to provide a gas stream compressed to a pressure in the 100 to about 1500 psig range to provide a compressed propylene-containing stream 208. In a preferred embodiment, the cooler/compression unit 80 pressurizes the dehydrogenator effluent to a pressure similar to the pressure of the bleed gas 129A. The compressed propylene-containing stream 208 is subjected to oligomerization reaction in the oligomerization unit 90, operating at the conditions described previously herein (under the subsection on oligomerization).

An oligomerization reactor effluent 210 exiting the oligomerization unit 90 includes propylene oligomers, propane, and hydrogen. The propylene oligomers include iso-olefins in the C6-C24 range. The oligomerization reactor effluent 210 is separated into an overhead vapor stream 214 and a liquid stream 212 in a separator unit 95. The separator unit may be flash drum or column, familiar to those skilled in the art. In a preferred embodiment, the overhead vapor stream 214 is recycled to the gas membrane 60 for separation of hydrogen and propane for recycle of the hydrogen to the HDO unit and the propane to the propane dehydrogenation system 70.

The separator liquid stream 212 represents the iso-olefin for combining with the lipid feed for HDO. As such, the propane derived from lipid hydrodeoxygenation is converted into isoparaffinic diesel fuel or kersone according to an aspect of the present technology. In embodiments, the isoparaffinic kerosene (a mainly C9-C15 fraction of the diesel fuel described herein) is separated by distillation of the diesel product (stream 122 in FIG. 1).

From the above description, it is clear that the present invention is well adapted to carry out the objects and to attain the advantages mentioned herein as well as those inherent in the invention. While presently preferred embodiments of the invention have been described for purposes of this disclosure, it will be understood that numerous changes may be made which will readily suggest themselves to those skilled in the art and which are accomplished within the spirit of the invention disclosed and claimed. The present technology, thus generally described, will be understood more readily by reference to the following examples, which are provided by way of illustration and are not intended to be limiting of the present technology.

EXAMPLES

Example 1. Preparation of Iso-Paraffin Composition to Model Product of Isobutene Oligomerization Isododecane and isohexadecane were obtained from Making Cosmetics, a commercial supplier. A blend of 85 wt. % isododecane and 15 wt. % isohexadecane was prepared to model the isobutene oligomerization product distribution, as disclosed in the prior art; e.g., US Patent Publication 2020/0010767, which is hereby incorporated by reference. This isoparaffinic composition was labeled "oligomers isoparaffin" for subsequent studies.

Example 2. Renewable Diesel from Lipids

Renewable diesel samples produced by lipid hydroprocessing (hydrodeoxygenation of lipid to n-paraffins followed by hydroisomerization of the n-paraffins) were analyzed for cloud point and corresponding concentration of unconverted n-octadecane (nC18). Cloud point was measured with automated instruments such as Koehler and PhaseTech as well as by the older but official method described in ASTM D2500. The nC18 content was measured using a gas chromatography technique (ASTM D2887) with values reported as GC peak area percentage (%). Various lipid feedstocks were used (e.g., used cooking oil, tallow, and distillers corn oil) for production of these samples.

Hydrodeoxygenation (HDO) of the feedstock was carried over a catalyst system comprising NiMo at WABT of 600-660° F. under 1700-1800 psig pressure. The HDO reactor system was operated with liquid product recycle. The HDO product was stripped of dissolved gas phase byproducts (e.g., hydrogen sulfide and ammonia) and isomerized in a hydroisomerization (HI). The HI reactor contained a bifunctional noble metal catalyst (with hydrogenation-dehydrogenation and acid functionalities). The HI reactor was maintained at about 970 psig pressure with temperature varied between 600 and 635° F. WABT to produce the range of samples varying in nC18 conversion and product cloud point.

Cloud point was plotted against nC18 content for 27 samples in the range of cloud points were in the range of −35° C. at 1.8% nC18 to +12° C. at 34% nC18. The results fell under a smooth curve given by Eq. 6 (with $R^2$ correlation coefficient of 0.994).

$$\text{Cloud Point (° C.)}=15.5 \ln (\% \text{ nC18})-43.0 \tag{6}$$

A sample of renewable diesel produced according to the method of this example was selected for blending studies with the oligomer isoparaffin composition of Example 1. The sample was found to have a cloud point of −10° C. (measured using the D2500 test method). The % nC18 was thus estimated using Eq. 6 to be 8.4%.

Example 3. Blends of Oligomer Iso-Paraffins and Renewable Diesel

The oligomer isoparaffin composition of Example 1 was blended with the −10° C. cloud point renewable diesel (RD) of Example 2 at three different ratios as shown in Table I. The samples were analyzed using a dual cloud point and freeze point analyzer from Phase Technologies (model no. CPA-70Xi). The cloud point method is ASTM D5773.

TABLE I

Fuel Properties for Blends of Oligomer
Iso-paraffins and Renewable Diesel

Blend Composition (wt. %)

| Isoparaffin Oligomer | Renewable Diesel | Freeze Point (° C.) | Cloud Point (° C.) | Derived Cetane Number |
|---|---|---|---|---|
| 25% | 75% | −11 | −24 | 69.4 |
| 50% | 50% | −19.5 | −29 | 56.9 |
| 75% | 25% | .26 | −37 | Not Measured |

Since the oligomer isoparaffin has no nC18, it acts as a diluent for this wax paraffin. As such, the nC18 content for the RD blends diluted with the value for 50% and 75% oligomer isoparaffin is expected to be 4.2% nC18 (=0.5× 8.4%) and 2.1% nC18 (=0.25×8.4%). If the oligomer isoparaffin blends were to behave like typical RD at various degrees of isomerization, the blends would have cloud points of −20.7° C. and −31.5° C. respectively as predicted by Eq. 6. However, these blends show surprisingly lower cloud points of −29° C. and −37° C. or about 6 to about 8° C. lower.

The derived cetane numbers in Table I are well above the 40 (ASTM D975) and 49 (EN 590) minimum specification limits for diesel fuel, despite the very low cetane number of the highly branched isobutene oligomerization products.

Example 4. Blends of Oligomer Iso-Paraffins and HDO Paraffins

The cloud point of an unisomerized HDO product after stripping (produced according to HDO conditions described in Example 1) was measure and found to be greater than >20° C. This HDO product was blended with the oligomer iso-paraffins of Example 2. Three blends were prepared at different ratio of oligomer isoparaffin to HDO product. The cloud points for the three blends are presented in Table II.

TABLE II

Cloud Points for Blends of Oligomer
Iso-paraffins and HDO Product

| Blend Composition (wt. %) | | Cloud Point (° C.) |
|---|---|---|
| Isoparaffin Oligomer | HDO product | |
| 25% | 75% | 13.7 |
| 50% | 50% | 6.4 |
| 75% | 25% | −3.6 |

The results suggest that a bio-based hydrocarbon comprising HDO product and isoparaffin oligomers is suitable for use as a diesel fuel for climates where the 10$^{th}$ percentile minimum temperatures (as indicated in ASTM D975 Section X5) is above 10° C. (50/50 blend), or above 0° C. (75/25 blend). Such fuels may be produced by conducting HDO with a feedstock comprising an olefin oligomer as described in this disclosure.

Having thus described the invention in connection with the preferred embodiments thereof, it will be evident to those skilled in the art that various revisions can be made to the preferred embodiments described herein without departing from the spirit and scope of the invention. It is my intention, however, that all such revisions and modifications that are evident to those skilled in the art will be included with in the scope of the following claims.

The invention claimed is:

1. A method for producing a renewable diesel fuel, comprising the steps of;
    a. combining a lipid with a hydrocarbon liquid to provide a combined feed;
    b. subjecting the combined feed to hydrodeoxygenation and hydrogenation in a hydrodeoxygenation reactor to provide a reactor effluent comprising C3-C24 hydrocarbons; and
    c. separating a C9-C24 hydrocarbon fraction from the reactor effluent;
    wherein the C9-C24 hydrocarbon fraction has a derived cetane number of 49 or higher and a cloud point less than 0° C.;
    wherein the hydrocarbon liquid comprises iso-olefins produced by olefin oligomerization.

2. The method of claim 1, further comprising producing the iso-olefins by oligomerization of isobutene.

3. The method of claim 2, wherein the isobutene is the product of isobutanol dehydration.

4. The method of claim 3, further comprising preparing the isobutanol by fermentation of sugars.

5. The method of claim 2, further comprising producing the iso-olefins by oligomerization of propylene.

6. The method of claim 5, wherein the propylene is the product of propane dehydrogenation.

7. The method of claim 1, wherein the product from the hydrodeoxygenation reaction is not used as diluent for reactor feed.

8. A method for producing a renewable diesel fuel, comprising the steps of;
    a. combining a lipid with a hydrocarbon liquid to provide a combined feed;
    b. subjecting the combined feed to hydrodeoxygenation and hydrogenation in a hydrodeoxygenation reactor to provide a reactor effluent comprising hydrocarbons, said hydrocarbons including a propane coproduct;
    c. separating a C9-C24 hydrocarbon fraction from the reactor effluent;
    d. subjecting the propane coproduct to dehydrogenation to produce a vapor stream having propylene and hydrogen; and
    e. oligomerizing the propylene to produce iso-olefins;
    wherein the C9-C24 hydrocarbon fraction has a derived cetane number of 49 or higher and the hydrocarbon liquid comprises the iso-olefins.

9. The method of claim 8, further comprising producing the iso-olefins by oligomerization of butenes.

10. The method of claim 9, wherein the butenes are derived from ethanol and/or isobutanol.

11. The method of claim 2, further comprising producing the iso-olefins by oligomerization of propylene.

12. The method of claim 1, wherein the product from the hydrodeoxygenation reaction is not used as diluent for reactor feed.

13. The method of claim 8 wherein the C9-C24 hydrocarbon fraction is distilled to provide a C9-C15 fraction kerosene.

14. The method of claim 13 wherein the C9-C15 fraction kerosene is used as a jet fuel blendstock.

* * * * *